United States Patent
Dajaku

(10) Patent No.: US 11,342,804 B2
(45) Date of Patent: May 24, 2022

(54) ELECTRIC MACHINE, ACTIVATION UNIT AND METHOD FOR OPERATING AN ELECTRIC MACHINE

(71) Applicant: FEAAM GmbH, Neubiberg (DE)

(72) Inventor: Gurakuq Dajaku, Neubiberg (DE)

(73) Assignee: FEAAM GMBH, Neubiberg (DE)

( * ) Notice: Subject to any disclaimer, the term of this patent is extended or adjusted under 35 U.S.C. 154(b) by 89 days.

(21) Appl. No.: 16/205,096

(22) Filed: Nov. 29, 2018

(65) Prior Publication Data
US 2019/0165630 A1 May 30, 2019

(30) Foreign Application Priority Data
Nov. 30, 2017 (DE) .......................... 102017128479.6

(51) Int. Cl.
*H02K 3/20* (2006.01)
*H02K 1/14* (2006.01)
(Continued)

(52) U.S. Cl.
CPC .............. *H02K 3/20* (2013.01); *H02K 1/146* (2013.01); *H02K 3/28* (2013.01); *H02K 11/042* (2013.01);
(Continued)

(58) Field of Classification Search
None
See application file for complete search history.

(56) References Cited

U.S. PATENT DOCUMENTS

2004/0257018 A1 12/2004 Tobias et al.
2005/0073280 A1* 4/2005 Yoshinaga .............. H02P 29/50
 318/727
(Continued)

FOREIGN PATENT DOCUMENTS

CN 1564765 1/2005
CN 1565765 A 1/2005
(Continued)

OTHER PUBLICATIONS

Gieras, J. F. et al, "Noise of Polyphase Electric Motors", 2006, pp. 44-53, CRC Press, Taylor & Francis Group, LLC.

*Primary Examiner* — Kawing Chan
*Assistant Examiner* — Bradley R Brown
(74) *Attorney, Agent, or Firm* — Morgan, Lewis & Bockius LLP

(57) ABSTRACT

An electric machine (21) having a stator (20) and having a rotor (29) rotatably mounted to the stator (20) is specified. The stator (20) comprises a stator winding (24), at least three teeth (23), and at least three grooves (22). In each case, one tooth (23) of the stator (20) is arranged between two grooves (22) along a circumference of the stator (20), and the stator winding (24) has at least three coils (25), wherein each of the coils (25) is wound around a tooth (23) of the stator (20), so that the stator winding (24) is a concentrated winding. In addition, the winding direction of all coils (25) is the same, each of the coils (25) is designed to be fed with its own phase current, and the stator (20) is designed to generate at least two rotary fields having different numbers of pole pairs independently of each other, in particular simultaneously. In addition, an activation unit (40) for the electric machine (21) and a method for operating an electric machine (21) are specified.

13 Claims, 13 Drawing Sheets

(51) Int. Cl.
　　　*H02K 11/049*　　(2016.01)
　　　*H02P 25/20*　　(2006.01)
　　　*H02P 29/50*　　(2016.01)
　　　*H02K 11/33*　　(2016.01)
　　　*H02K 19/28*　　(2006.01)
　　　*H02K 3/28*　　(2006.01)
　　　*H02K 19/12*　　(2006.01)
　　　*H02K 11/042*　　(2016.01)

(52) U.S. Cl.
　　　CPC ........... *H02K 11/049* (2016.01); *H02K 11/33* (2016.01); *H02K 19/12* (2013.01); *H02K 19/28* (2013.01); *H02P 25/20* (2013.01); *H02P 29/50* (2016.02)

(56) References Cited

U.S. PATENT DOCUMENTS

| | | | |
|---|---|---|---|
| 2006/0267540 | A1* | 11/2006 | Chu ................. H02P 25/22 318/778 |
| 2009/0251024 | A1* | 10/2009 | Huppunen ............. H02K 29/03 310/195 |
| 2016/0049838 | A1* | 2/2016 | Dajaku .................... H02K 1/24 310/68 D |
| 2017/0047804 | A1 | 2/2017 | Dajaku |

FOREIGN PATENT DOCUMENTS

| | | |
|---|---|---|
| CN | 104167892 A | 11/2014 |
| DE | 102004055317 | 5/2006 |
| DE | 60305263 | 3/2007 |
| DE | 60320056 | 7/2008 |
| DE | 102013102900 A1 | 9/2014 |
| DE | 102014105642 A1 | 10/2015 |
| DE | 102015223179 | 5/2016 |
| JP | 2008067461 A * | 3/2008 |
| KR | 20060133301 A | 12/2006 |

\* cited by examiner

|    | 2     | 4     | 6     | 8     | 10    | 12    | 14    | 16    | 18    | 20    |
|----|-------|-------|-------|-------|-------|-------|-------|-------|-------|-------|
| 4  | 70,7  |       | 70,7  |       | 70,7  |       | 70,7  |       | 70,7  |       |
| 5  | 58,8  | 95,2  | 95,2  | 58,8  |       | 58,8  | 95,2  | 95,2  | 58,8  |       |
| 6  | 50    | 86,6  |       | 86,6  | 50    |       | 50    | 86,6  |       | 86,6  |
| 7  | 43,4  | 78,2  | 97,6  | 97,6  |       | 43,4  | 78,2  | 43,4  | 78,2  | 97,6  |
| 8  | 38,3  | 70,7  | 92,5  |       | 92,5  | 70,73 | 38,3  |       | 38,3  | 70,73 |
| 9  | 34,2  | 64,3  | 86,6  | 98,5  | 98,5  | 86,6  | 64,3  | 34,2  |       |       |
| 10 | 30,9  | 58,8  | 80,9  | 95,2  |       | 95,2  | 80,9  | 58,8  | 30,9  |       |
| 11 | 28,2  | 54,1  | 75,6  | 91    | 99,1  | 99,1  | 91    | 75,6  | 54,1  | 28,2  |
| 12 | 25,8  | 50    | 70,6  | 86,7  | 96,7  |       | 96,7  | 86,7  | 70,6  | 50    |
| 13 | 23,9  | 46,4  | 66,3  | 82,3  | 93,5  | 99,4  | 99,4  | 93,5  | 82,3  | 66,3  |
| 14 | 22,25 | 43,4  | 62,4  | 78,2  | 90,15 | 97,15 |       | 97,15 | 90,15 | 78,2  |
| 15 | 20,8  | 40,67 | 58,8  | 74,3  | 86,6  | 95,2  | 99,6  | 99,6  | 95,2  | 86,6  |
| 16 | 19,5  | 38,3  | 55,6  | 70,73 | 83,2  | 92,4  | 98,2  |       | 98,2  | 92,4  |
| 17 | 18,37 | 36,12 | 52,64 | 67,3  | 79,8  | 89,5  | 96,2  | 99,6  | 99,6  | 96,2  |
| 18 | 17,4  | 34,2  | 50    | 64,3  | 76,6  | 86,6  | 94,4  | 98,6  |       | 98,6  |

ELECTRIC MACHINE, ACTIVATION UNIT AND METHOD FOR OPERATING AN ELECTRIC MACHINE

The present application relates to an electric machine, an activation unit and a method for operating an electric machine.

Typically, electric machines include a stator and a relatively movable rotor for it. Electric machines can operate as a motor or as a generator, wherein electrical energy is converted into kinetic energy or vice versa.

The stator of the electric machine usually has an electrically conductive stator winding. The stator winding can be formed by bars which are arranged in grooves of the stator. At higher frequencies, however, skin effects can occur in the bars, which can lead to increased losses. In addition, the magnetomotive force of a rotary field generated by the stator can only be increased by increasing the phase currents of the respective bars. This can lead to higher costs or a larger volume of power electronics.

An object to be solved is to specify an electric machine which can be operated efficiently. Another object to be solved is to specify an activation unit which can be operated efficiently. Another object to be solved is to specify an efficient method for operating an electric machine.

The objects are achieved by the subject matters of the independent claims. Advantageous embodiments and further developments are specified in the dependent claims.

According to at least one embodiment of the electric machine, the electric machine comprises a stator and a rotor rotatably mounted to the stator. The rotor can be formed, for example, by a cage rotor, a rotor having permanent magnets, an externally excited synchronous rotor, a rotor for a switched reluctance machine, or a rotor for a synchronous reluctance motor. The rotor can be an internal rotor or an external rotor. An air gap can be arranged between the stator and the rotor.

The stator comprises a stator winding. The stator winding can be electrically conductive, at least in places. In addition, the stator winding can be arranged in the stator, at least in places. The stator winding can be connected to a power electronics and designed to generate a rotary field.

The stator further comprises at least three teeth. The teeth can extend over a longitudinal axis of the stator. In addition, the teeth can be distributed along a circumference of the stator. The stator can have a cross-section which extends perpendicular to a longitudinal axis of the stator. The circumference of the stator can be given by the circumference around the cross-section. The cross-section of the stator can be approximately circular. The teeth can be evenly distributed along the circumference of the stator. The teeth can be formed integrally with the stator.

It is also possible for the stator to have a stator lamination or a plurality of stator laminations. The stator lamination or the stator laminations can form the teeth. The teeth can be arranged on an inner side of the stator. This means, for example, that the teeth are arranged on a side of the stator, on which side a rotor of the electric machine can be arranged. The teeth can be shaped such that recesses are arranged between the teeth along the circumference of the stator. Thus, each tooth can be spaced apart from another tooth and a recess can be arranged between each two teeth.

It is also possible that the teeth are arranged as projections on an outer side, for example the inner side, of the stator. Each of the projections can extend uniformly over the entire longitudinal axis of the stator. The teeth can be further formed as spikes or peaks.

The stator further has at least three grooves. The grooves can be recesses in the stator. The grooves can each extend along the entire longitudinal axis of the stator. The grooves can be arranged completely inside the stator. In this case, the grooves have no opening to the outside of the stator. It is also possible that the grooves each have at least one opening. The openings can be arranged, for example, on an outer side of the stator. For example, the openings can be arranged on a side of the stator on which a rotor of the electric machine can be arranged. The grooves can be distributed along the circumference of the stator. For example, the grooves can be evenly distributed along the circumference of the stator.

In each case, one tooth of the stator is arranged between two grooves along the circumference of the stator. The grooves and the teeth can extend parallel along the longitudinal axis of the stator. The grooves can be the recesses, which can be arranged between each two teeth. Thus, each of the teeth can be arranged between every two grooves.

The stator winding has at least three coils, wherein each of the coils is wound around a tooth of the stator, so that the stator winding is a concentrated winding. Another term for a concentrated winding can be a tooth coil winding. The at least three coils can comprise an electrically conductive material. Each of the coils can have a plurality of windings. In other words, each of the coils can have a plurality of conductor sections, wherein at least two conductor sections are arranged in different grooves of the stator. The conductor sections are connected with each other and form the windings of the coil. Each of the coils can be wound around a tooth of the stator such that at least one conductor section of each coil extends parallel to the longitudinal axis of the stator. The coils can be electrically insulated from each other. In addition, each of the coils can be connected to its own power supply unit.

Each of the coils can form an electrical phase of the stator winding. This can mean that each of the coils can be driven separately and that the coils are electrically insulated from each other. The stator winding can thus have a plurality of electrical phases or at least three electrical phases for generating a rotary field.

The winding direction of all coils is the same. That can mean that all coils are wound in the same way. Each of the coils can be wound in the same orientation around a tooth of the stator.

Each of the coils is designed to be fed with its own phase current. The various phase currents can be provided by power electronics. Each of the coils can be connected to its own power supply unit, which is designed to feed each of the coils with its own phase current. The phase currents can be out of phase with each other. In addition, the phase currents can have different amplitudes. By feeding the coils with their own phase current, the stator winding can generate a rotary field during operation of the electric machine. The rotary field can be designed to drive a rotor of the electric machine.

The stator winding of a stator described here can have at least three coils and thus at least three electrical phases. Furthermore, the stator winding can have any greater number of electrical phases. The number of electrical phases of the stator winding is not limited to a multiple of 3. The stator winding, for example, can thus have ten or eleven electrical phases.

The stator is designed to generate at least two rotary fields with different numbers of pole pairs independent of each other. The stator can be further designed to simultaneously generate at least two rotary fields with different numbers of pole pairs independent of each other. By feeding the coils of the stator winding with phase currents which are out of phase with each other, the stator can generate a time-varying magnetic field, for example, a rotary field. The number of pole pairs indicates the number of pole pairs of the rotary field. The number of pole pairs can be adjustable.

The phase currents can be superimposed, for example, to generate a first rotary field and a second rotary field. The parameters of each of the rotary fields can thus be changed or controlled independently of each other. In this case, the first rotary field can have a different number of pole pairs than the second rotary field. For example, the number of pole pairs of each of the rotary fields can be changed or adjusted without changing the other rotary field. That is, the number of pole pairs of each of the rotary fields can be changed or set separately for each rotary field. The rotary fields can thus be generated independently of each other.

It is also possible to superimpose the phase currents to generate more than two rotary fields. The superimposition of phase currents for the independent generation of different rotary fields is made possible by each of the coils being designed to be fed with its own phase current.

An electric machine having a stator, which is designed to generate at least two rotary fields having different numbers of pole pairs, can be used for different types of electric machines and for different operating states. For example, such an electric machine can be used for a current-excited synchronous machine in which a working wave of a rotary field is used to generate a torque and in which a higher harmonic of the working wave is used to transfer energy to a rotor. In this case, advantageously, the working wave, which can be a fundamental wave, and the higher harmonic can be set and controlled separately from each other.

Furthermore, in an asynchronous machine, several rotary fields having different numbers of pole pairs can be generated simultaneously and used to generate a torque. In addition, for an electric machine described here, the contribution to the total torque for each of the rotary fields can be adjusted via the phase currents.

In addition, an electric machine described here can have a rotor having a plurality of permanent magnets. In this case, the permanent magnets can be arranged in the rotor such that the rotor can interact with rotary fields having at least two different numbers of pole pairs. Thus, for example, a rotary field can be generated in the stator, with which field only one of the numbers of pole pairs of the rotor can interact. It is also possible that multiple rotary fields are generated in the stator, with which fields different numbers of pole pairs of the rotor can interact.

Similarly, an electric machine described here can be used for a synchronous reluctance machine, wherein the rotor is designed to interact with more than one number of pole pairs.

An electric machine described here can be further used in various types of electric machines, for example, hybrid machines. Hybrid machines can have various combinations of rotors, for example, combinations of at least two of: an asynchronous rotor, a rotor having permanent magnets, a rotor for a switched reluctance machine, a rotor for a synchronous reluctance machine, and a rotor having multiple numbers of pole pairs.

The electric machine described here is based, among other things, on the idea that the maximum achievable current in the stator winding can be increased in which the stator winding is formed by at least three coils having multiple conductor sections per coil. In contrast to an electrical winding which is formed with individual conductor filaments, a higher maximum total current per groove can be made possible with a stator winding with coils. A greater magnetomotive force of the rotary field generated by the stator winding can be generated with a higher total current per groove. Since the stator winding comprises coils, the maximum total current per groove can be increased without significantly increasing the volume or the cost of the power electronics. The stator can thus be operated more efficiently.

Furthermore, the stator of the electric machine can have any number of at least three electrical phases. Therefore, the electric machine can have various types of rotors, for example, an asynchronous rotor, a rotor having permanent magnets, an externally excited synchronous rotor, a rotor for a switched reluctance machine, or a rotor for a synchronous reluctance motor. In addition, various parameters of the stator or the electric machine can be optimized due to the arbitrary number of at least three electrical phases. For example, the number of electrical phases can be selected such that parameters such as cogging torque, torque ripple, power density or suppression of noise and vibration problems can be optimized.

According to at least one embodiment of the electric machine, the phase currents are out of phase with each other. This means that the phase currents are temporally offset from each other or temporally phase-shifted. Phase currents can be set up to generate a rotary field which is variable in time, so that a torque can be generated in a rotor of the electric machine. The electric machine can thus be advantageously used as a motor.

According to at least one embodiment of the electric machine, one coil of the stator winding is wound around each tooth of the stator. In this case, the number of electrical phases of the stator winding can be equal to the number of teeth of the stator. Exactly one coil of the stator winding can be wound around each tooth of the stator. Such a type of stator winding can enable a high winding factor.

According to at least one embodiment of the electric machine, one coil of the stator winding is wound around every second tooth of the stator. That means that each tooth around which a coil of the stator winding is wound is arranged between two teeth which are free from the coils of the stator winding. This also means that the teeth of the stator, which are arranged between every two teeth around which a coil of the stator winding is wound, are free of the coils of the stator winding. In this case, it is not necessary to electrically insulate two coils in a groove against each other, since each of the coils is arranged in two respective grooves of its own.

According to at least one embodiment of the electric machine, the coils are electrically connected to each other on a first side of the stator via a short-circuit means. This means that the coils are connected to each other on the first side of the stator to form a short circuit. For this purpose, the coils can each be electrically conductively connected to the short-circuit means. The short-circuit means can be a short-circuit ring. The short-circuit means can comprise an electrically conductive material. On a second side of the stator facing away from the first side, each of the coils can be connected to a power supply unit, for example, a half-bridge. This arrangement allows the separate control of the coils.

According to at least one embodiment of the electric machine, the coils each comprise a single conductor or in each case a plurality of conductor filaments arranged parallel to each other and electrically connected in parallel. The coils can thus each comprise a single electrically conductive wire or bar or be formed with one or more electrically conductive materials. It is also possible that the coils each comprise a plurality of electrically conductive wires, bars or conductor filaments, which are arranged parallel to each other. It is also possible that some coils each comprise a single conductor and that other coils each comprise a plurality of conductor filaments arranged parallel to each other and electrically connected in parallel. Each coil can thus be supplied with its own phase current, so that the stator can generate a rotary field. In addition, in the case where the coils each comprise a plurality of electrically conductive wires, skin effects in the coils can be reduced.

According to at least one embodiment of the electric machine, the stator is designed to generate at least one rotary field in which the number of pole pairs is variable. For example, the number of pole pairs can be changed by changing the phase currents. Since each of the coils is designed to be fed with its own phase current, the number of pole pairs can be changed. The number of pole pairs can thus depend on the phase currents. The number of poles of a rotary field can be, for example, equal to the number of electrical phases of the stator. It is further possible that the number of poles of a rotary field is less than the number of electrical phases of the stator. If the rotor of the electric machine can interact with the number of pole pairs of the rotary field, the rotor can be driven by a torque generated by the rotary field.

Advantageously, the number of pole pairs of the rotary field generated by the stator can be changed without changing the structure of the stator. Thus, it is also possible to change the number of pole pairs when operating the electric machine.

According to at least one embodiment of the electric machine, the number of conductor sections of the coils on a first side of at least one tooth is greater than the number of conductor sections of the coils on a second side of the same tooth facing away from the first side. This means, for example, that the coils on the first side of the stator are connected to the short-circuit means and on the second side of the stator are each connected to a power supply unit.

If the coils comprise a plurality of conductor sections, one more conductor section is required on one side of a tooth than on a side facing away from this side, so that the coils are connected to the short-circuit means on the first side of the stator and can be connected to a power supply unit on the second side of the stator. For example, the first side of a tooth can be adjacent to a different groove than the second side of the same tooth. The number of conductor sections of at least one coil on the first side of the tooth, around which the coil is wound, can be greater than the number of conductor sections of the same coil on the second side of the tooth. For example, the number of conductor sections of at least one coil can be greater by 1 or by at least 1 on the first side of a tooth in comparison to the number of conductor sections on the second side. It is also possible that the number of conductor sections of each coil on the first side of the tooth, around which the respective coil is wound, is greater than the number of conductor sections of the same coil on the second side of the respective tooth. For example, the number of conductor sections of each coil on the first side of a tooth can be greater by 1 or by at least 1 than the number of conductor sections on the second side.

This can further mean that the number of conductor sections of at least one coil in a first groove is greater than the number of the conductor sections of the same coil in a second groove, wherein the first and the second groove are arranged adjacent to each other and each adjacent to the same tooth. It is further possible that the number of conductor sections of each coil in the first groove is greater than the number of conductor sections of the respective coil in the second groove.

It is also possible that, for each of the coils, the number of conductor sections of the respective coil on the first side of at least one tooth is greater than the number of conductor sections of the respective coil on the second side of the same tooth or vice versa. For example, the number of conductor sections for each of the coils on the first side of the respective tooth can differ by at least 1 from the number of conductor sections of the respective coil on the second side of the respective tooth. The coils can be arranged such that at least one conductor section of each coil is arranged in a first groove and at least one further conductor section is arranged in a second groove, wherein the first and the second groove are adjacent to each other and adjacent to the same tooth. The number of conductor sections in the first groove can be different for each of the coils from the number of the further conductor sections in the second groove.

In the case that one coil is wound around each of the teeth of the stator, the conductor sections of the coils can be distributed such that the same number of conductor sections is arranged in each groove.

According to at least one embodiment of the electric machine, the rotor has an excitation winding and a field winding. The excitation winding and the field winding can each have at least three coils, which can be arranged along a circumference of the rotor. The coils of the field winding can be connected to each other in series. Such a rotor can be used with a stator described here for a current-excited (self-excited) synchronous machine and/or for a brushless current-excited synchronous machine.

According to at least one embodiment of the electric machine, the excitation winding has at least three coils, and each of the coils is connected to its own rectifier. The rectifiers are electrically connected to a voltage output. The induced voltage can thus be rectified for each of the coils. Such a rotor can be used with a stator described here for a current-excited (self-excited) synchronous machine and/or for a brushless current-excited synchronous machine.

Furthermore, an activation unit for the electric machine is specified.

According to at least one embodiment of the activation unit, the activation unit comprises a compensation unit which is designed to generate compensation signals for at least partial compensation of at least one undesired component of a magnetic force, wherein the magnetic force is induced by a rotary field generated by the stator during operation of the electric machine. The compensation unit can be arranged such that each of the coils can be fed with a respective compensation signal of its own. The compensation unit is thus designed to generate at least three compensation signals. The composition signals can be designed to generate at least one compensation component in the stator during operation of the electric machine. The compensation component can be a harmonic component of a rotary field generated by the stator during operation of the electric machine. Harmonic components of a rotary field can be, for example, a fundamental wave, harmonics, modes or higher harmonics of the rotary field.

Rotary fields, which can be generated by the stator during operation of the electric machine, can have harmonic components which, at least in one frequency range, can contribute to vibrations, oscillations or noise development in the electric machine. Vibrations, oscillations and noise development during operation of the electric machine are usually undesirable.

The compensation component can therefore be designed to compensate for at least one undesired harmonic component of a rotary field generated by the stator. That means that the compensation component can be designed to induce a magnetic force that at least partially compensates for an undesired component of the magnetic force which is induced by a rotary field generated by the stator during operation of the electric machine. The undesired harmonic component may, for example, be a harmonic component which generates vibrations and/or noises during operation of the electric machine.

To compensate for an undesired harmonic component, the compensation component can have, for example, the same amplitude as the harmonic component to be compensated or the harmonic components to be compensated, and a phase shift of 180° to the harmonic component to be compensated or to the harmonic components to be compensated. In this case, the magnetic force generated by the compensation component and the magnetic force generated by at least one harmonic component of the rotary field generated by the stator during operation can at least partially compensate each other. Preferably, the magnetic force generated by the compensation component and the magnetic force generated by at least one harmonic component of the rotary field generated by the stator during operation can compensate or largely compensate each other. Thus, not all of the magnetic force which is induced by the rotary field generated during operation is compensated, but rather only at least one undesired component of the induced magnetic force.

The compensation signals can further be designed to generate at least one compensation component or several compensation components in the stator during operation of the electric machine. If several compensation components are generated, then at least two undesired components of the magnetic force which is induced by a rotary field generated by the stator during operation of the electric machine can be at least partially compensated. Furthermore, it is possible for at least two undesired components of the magnetomotive force, which is induced by at least two rotary fields generated by the stator during operation, to be compensated by at least one compensation component.

The compensation unit can be designed to generate adjustable compensation signals. For this, for example, parameters such as the amplitude or a phase shift for the compensation signals can be set. Before the compensation signals generated by the compensation unit are fed into the stator winding, the compensation signals can be superimposed with signals for generating the phase currents, by which a rotary field can be generated.

According to at least one embodiment of the activation unit, the compensation signals are generated at at least one specifiable operating point of the electric machine. An operating point of the electric machine can correspond, for example, to a rotational speed of the rotor. Specifying at least one operating point at which the compensation signals are generated enables the compensation of at least one undesired component of the magnetic force in the event that the respective component of the magnetic force contributes to the occurrence of vibrations, oscillations or noises in the electric machine at the at least one operating point.

For example, at least one operating point can be determined on a test bench, at which operating point vibrations, oscillations and/or noise development occur. The at least one determined operating point can be specified for the compensation unit, so that the compensation signals are generated at the at least one determined operating point. Advantageously, undesired vibrations, oscillations and/or noise during operation of the electric machine can thus be avoided or reduced.

Furthermore, a method for operating an electric machine is specified. Thus, all features of the described electric machine and the described activation unit are also disclosed for the method for operating an electric machine and vice versa.

According to at least one embodiment of the method for operating an electric machine, the method comprises the step of providing a stator of the electric machine having at least three teeth, at least three grooves, and a stator winding which has at least three coils. The electric machine can also include a rotor rotatably mounted to the stator.

According to at least one embodiment of the method for operating an electric machine, the method has the step of feeding at least three coils of the stator each with its own phase current. Each of the coils can be fed by its own power supply unit with its own phase current.

According to at least one embodiment of the method for operating an electric machine, one tooth of the stator is arranged in each case along a circumference of the stator between two grooves.

According to at least one embodiment of the method of operating an electric machine, each of the coils is wound around one tooth of the stator so that the stator winding is a concentrated winding.

According to at least one embodiment of the method for operating an electric machine, the winding direction of all coils is the same.

According to at least one embodiment of the method for operating an electric machine, the stator is designed to generate at least two rotary fields having different numbers of pole pairs, in particular simultaneously.

According to at least one embodiment of the method for operating an electric machine, the method has the steps of generating at least one rotary field by the stator during operation of the electric machine, generating at least three compensation signals by a compensation unit, wherein each compensation signal is respectively associated with a phase current, and the superposition of a respective compensation signal on the respectively associated phase current, whereby at least one undesired component of a magnetic force induced by the rotary field is at least partially compensated. This means that the coils can be fed with both the phase currents for generating the rotary field and with the compensation signals. In this case, for each coil the respective phase current and the respective compensation signal are superimposed. Advantageously, by generating at least one compensation component, at least one undesired component of a magnetic force induced by the rotary field can be at least partially compensated or largely compensated. Undesired vibration and/or noise during operation of the electric machine can thus be prevented or reduced.

In the following, the electric machine described here, the activation unit and the method for operating an electric machine are explained in more detail in connection with embodiments and the associated figures.

Figures 3A, 3B:
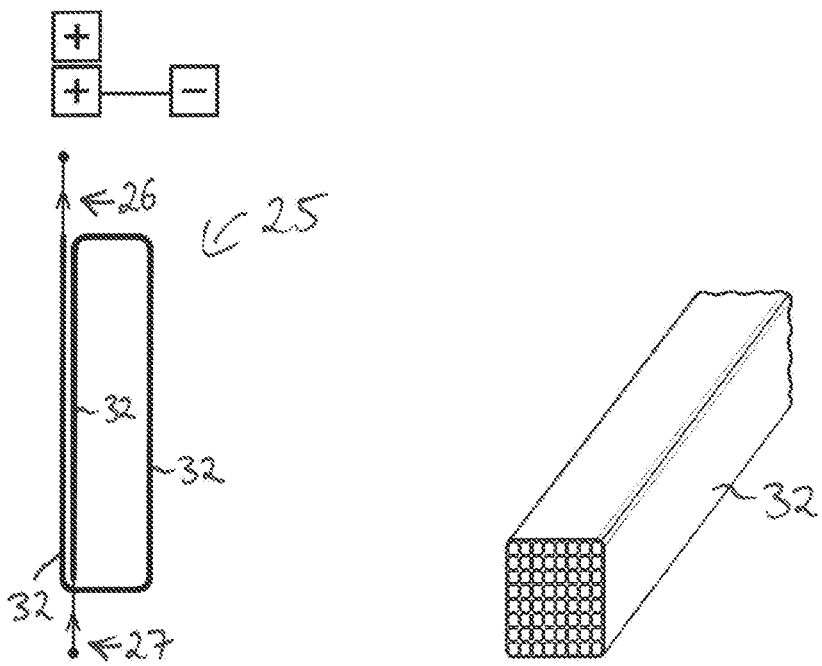

The construction of a coil is shown by way of example in FIGS. 3A and 3B.

FIGS. 4, 5, 6, 7A, 7B, 8A and 8B show arrangements of the stator winding according to various embodiments.

FIGS. 9A, 9B, 9C and 10 show the magnetomotive force for various embodiments of a stator.

Figure 11A:
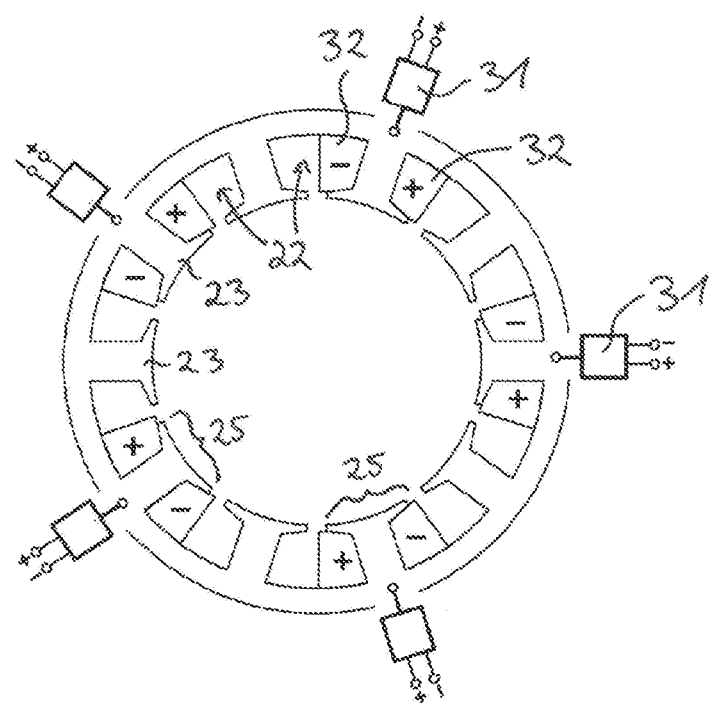
Figures 11B, 12:
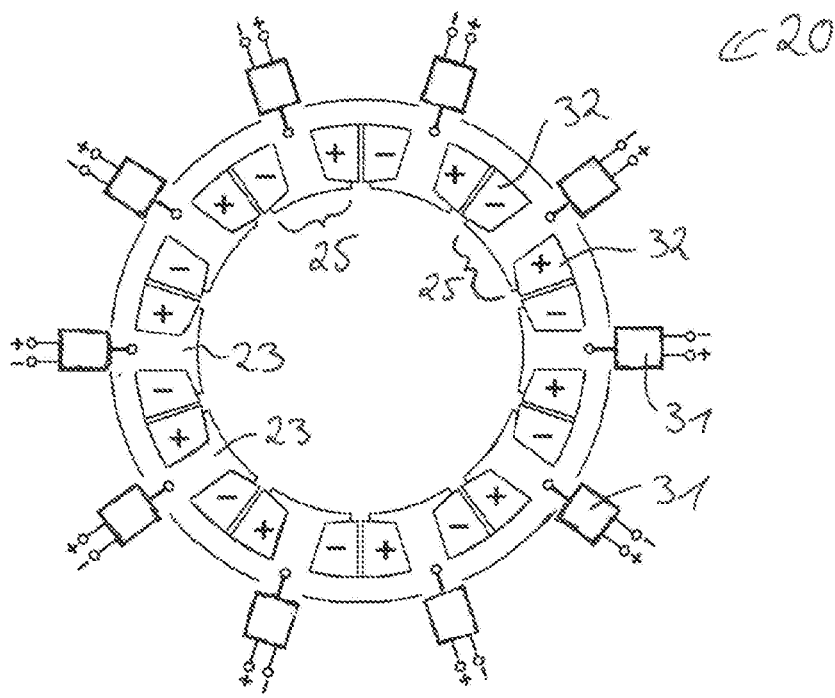

FIGS. 11A and 11B show schematic cross-sections through further embodiments of a stator.

FIG. 12 specifies the winding factors for various embodiments of a stator.

Figure 13A:
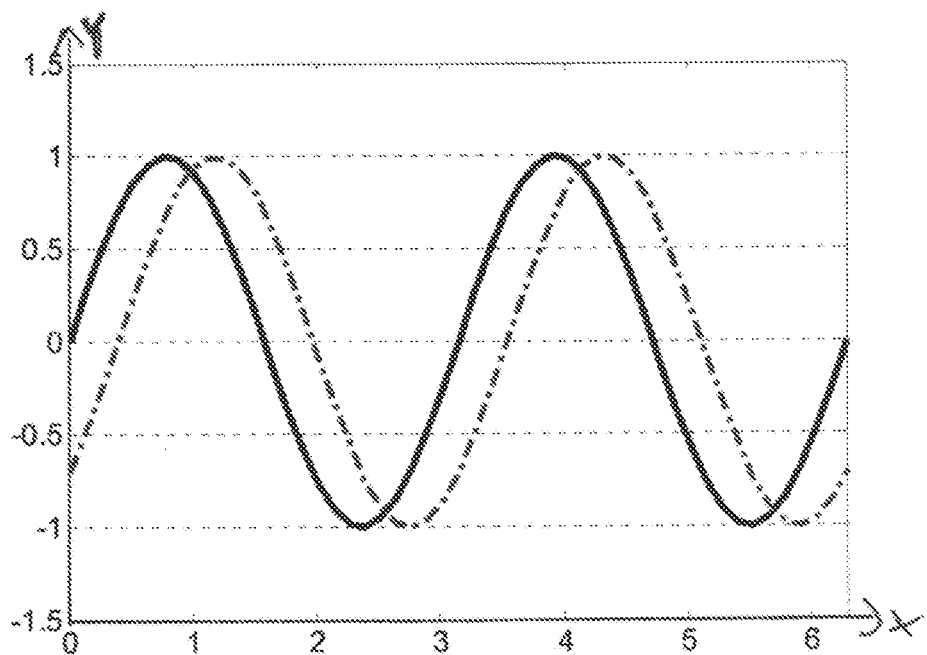
Figure 13B:
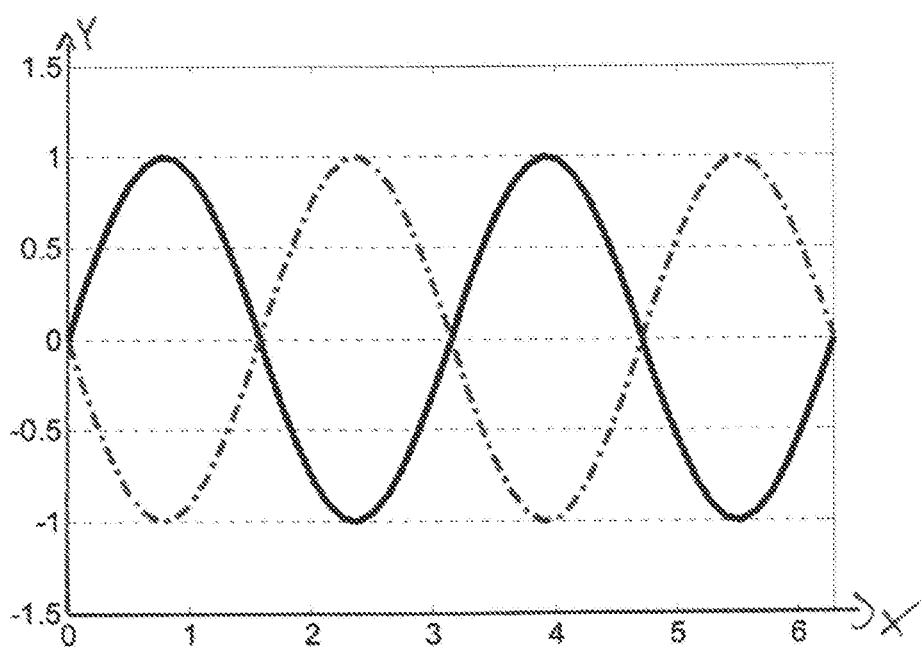

Compensation components are shown by way of example in FIGS. 13A and 13B.

Figure 14:
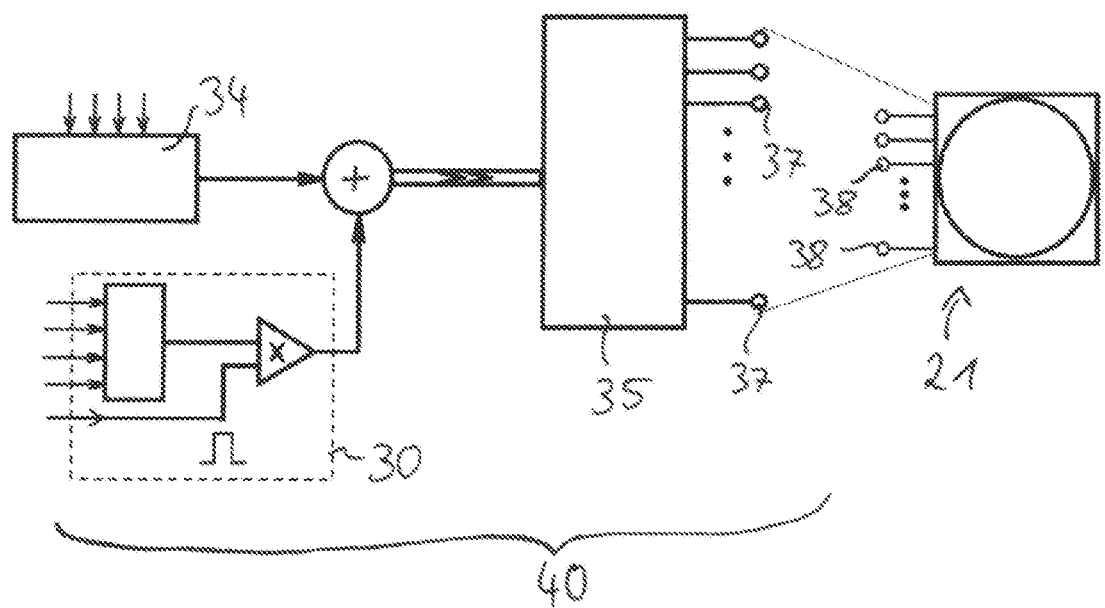

FIG. 14 shows a schematic structure of an embodiment of an activation unit.

Figure 15:
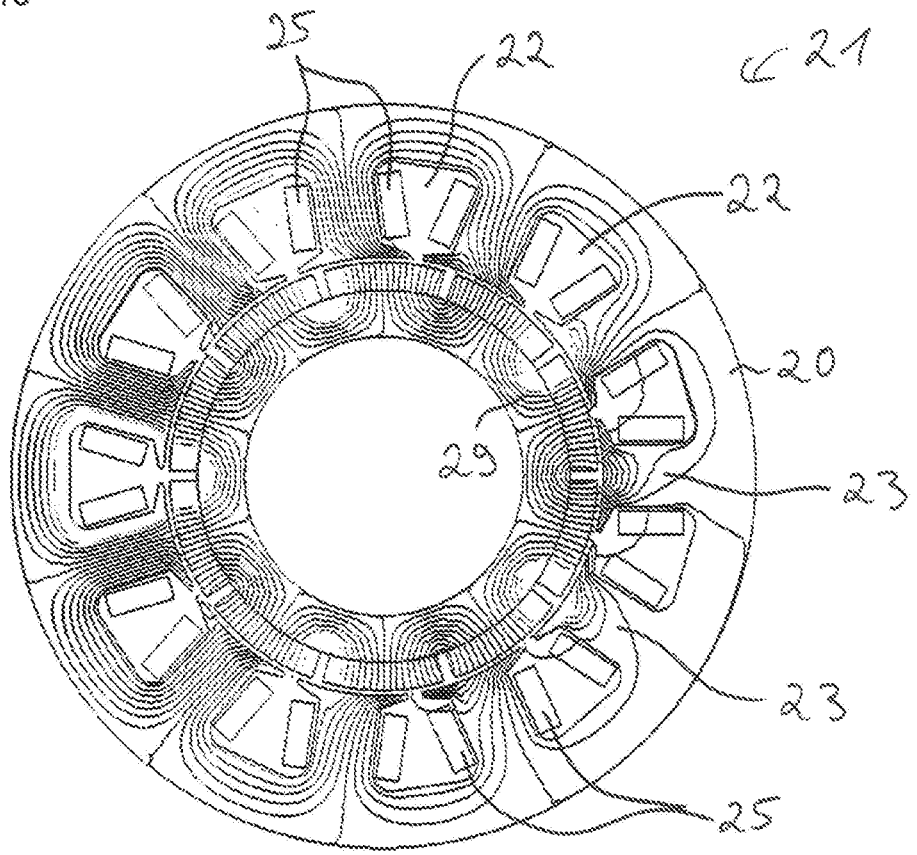

FIG. 15 shows a cross-section through an embodiment of an electric machine.

Figure 16:
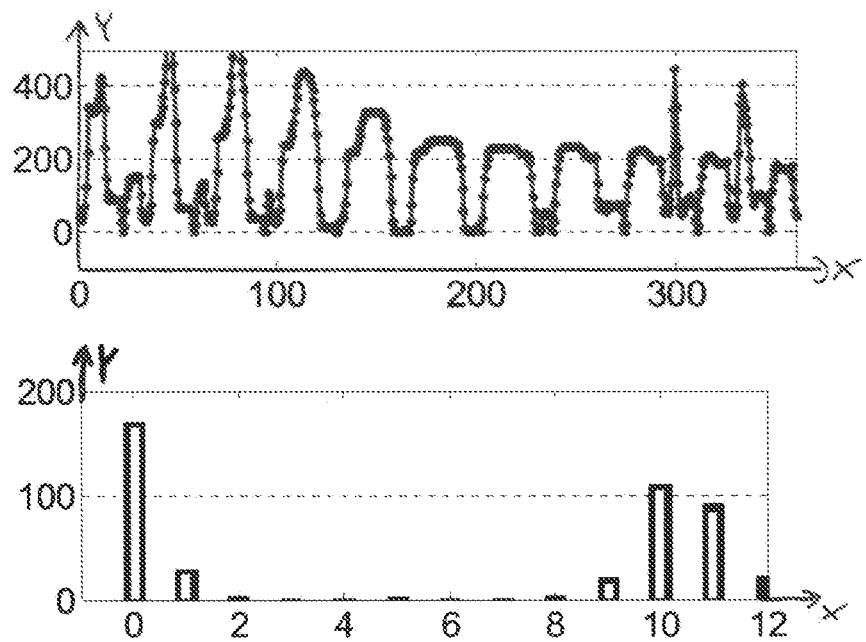

FIG. 16 shows the force density for an embodiment of an electric machine.

Figure 17:
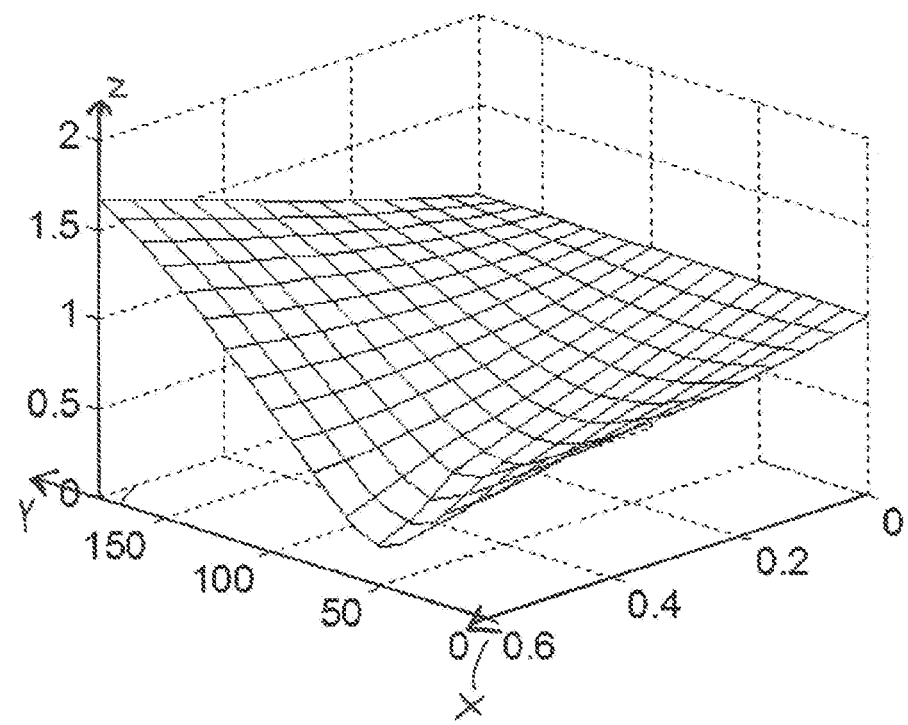

FIG. 17 shows, by way of example, the compensation of a component of a magnetic force for an embodiment of an electric machine.

Figure 18A:
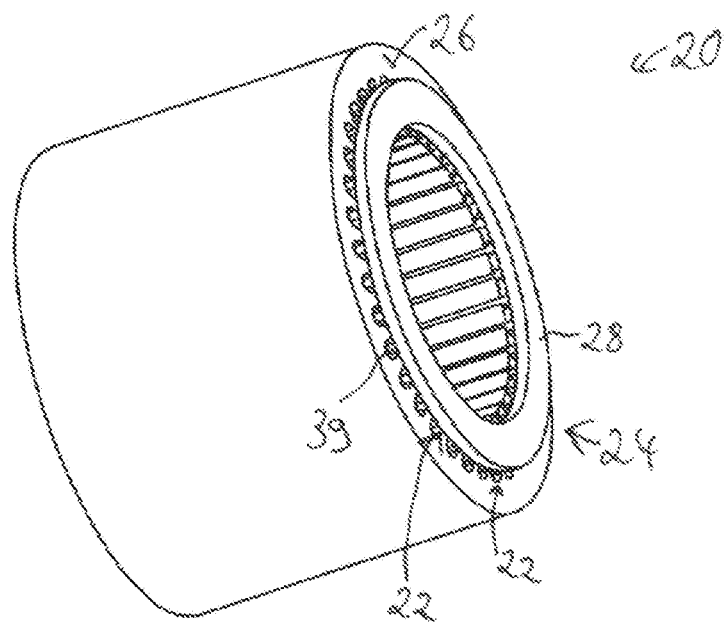
Figure 18B:
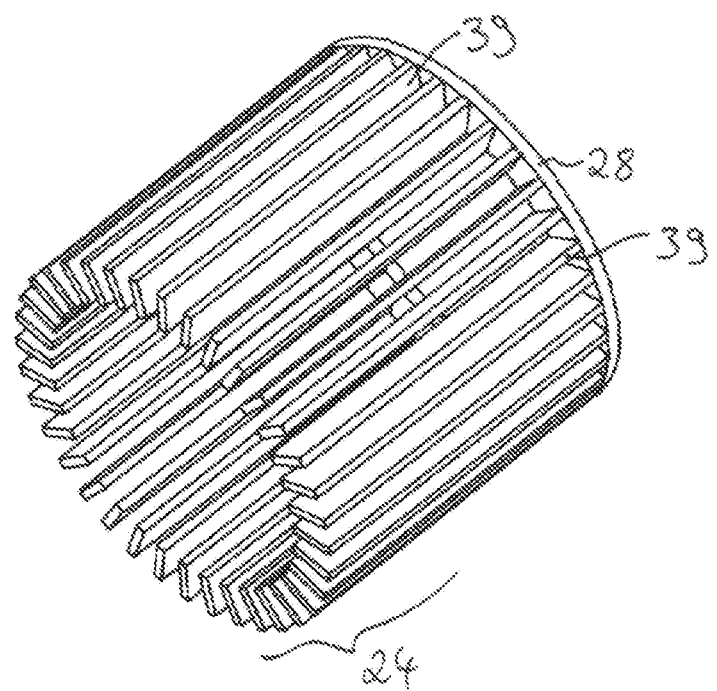

FIGS. 18A and 18B show a stator for an electric machine.

FIGS. 19A, 19B, 19C and 19D show an embodiment of a rotor.

Figure 1:
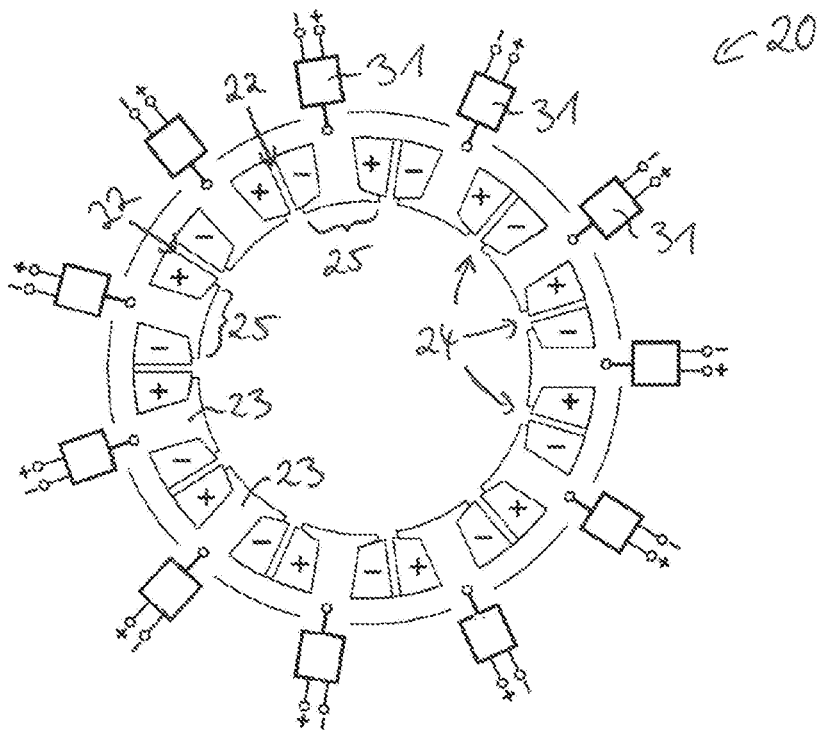
FIG. 1 shows a schematic cross-section through an embodiment of a stator.

FIG. 1 shows a schematic cross-section through an embodiment of a stator 20 for an electric machine 21. The stator 20 extends along a longitudinal axis which runs perpendicular to the surface of the cross-section. The cross-section of the stator 20 is circular. The stator 20 has the shape of a hollow cylinder. A rotor 29 can be arranged in the interior of the stator 20.

The stator 20 has a stator winding 24. The stator winding 24 has eleven coils 25. Each of the coils 25 is wound around a tooth 23 of the stator 20. The stator winding 24 is a concentrated winding. The winding direction of the eleven coils 25 is the same for all coils 25. The winding direction of each of the coils 25 is specified with plus and minus signs. The stator 20 further has eleven teeth 23, which are uniformly distributed along a circumference of the stator 20. The teeth 23 can be formed such that in each case a recess is arranged between two teeth 23. In addition, the stator 20 has 11 grooves 22. The grooves 22 are uniformly distributed along the circumference of the stator 20. One tooth 23 of the stator 20 is arranged in each case between two grooves 22 along the circumference of the stator 20.

Each of the coils 25 forms an electrical phase of the stator winding 24. In addition, each of the coils 25 is designed to be fed with its own phase current. For this purpose, each of the coils 25 is connected to its own power supply unit 31. Since each of the coils 25 can be driven separately by its own power supply unit 31, the phase currents can be out of phase with each other. The stator 20 is designed to generate at least two rotary fields having different numbers of pole pairs independent of each other, in particular simultaneously.

Figure 2:
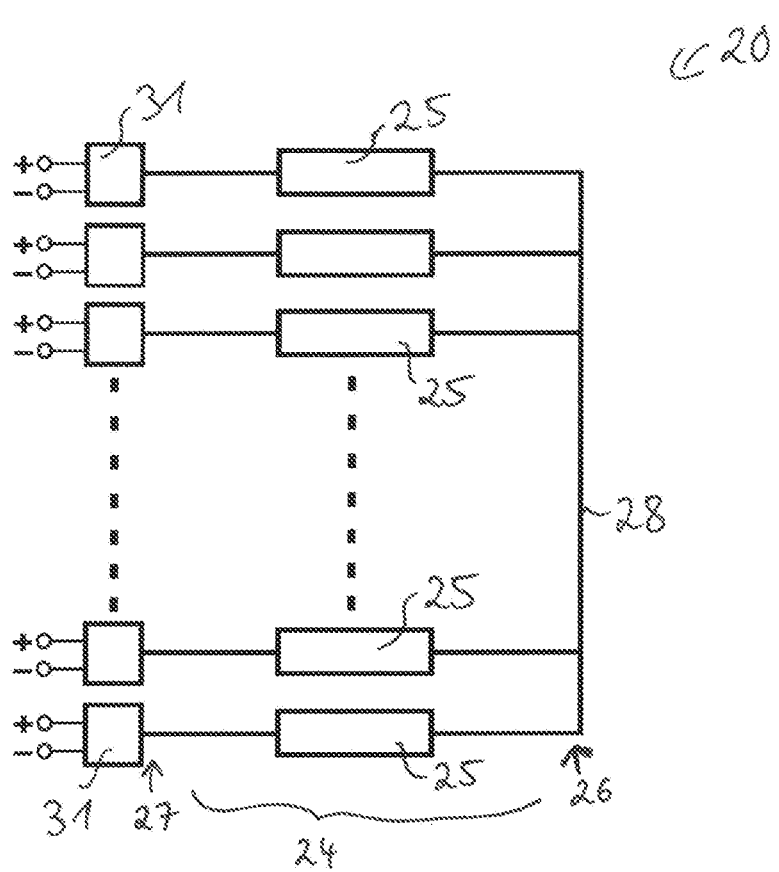
FIG. 2 shows a schematic structure of an embodiment of a stator.

FIG. 2 shows a schematic structure of an embodiment of the stator 20. The stator 20 has a plurality of coils 25 which are each connected to a power supply unit 31 of its own.

By way of example, five coils 25 with their power supply units 31 are shown in FIG. 2. The coils 25 are electrically connected to each other via a short-circuit means 28 on a first side 26 of the stator 20. The coils 25 are connected to their respective power supply units 31 on a second side 27 facing away from the first side 26.

FIG. 3A shows the structure of a coil 25 by way of example. The coil 25 has, by way of example, three conductor sections 32. The conductor sections 32 extend mainly along the longitudinal axis of the stator 20. In addition, the winding direction of the coils 25 is specified schematically. Two of the conductor sections 32 extend in one direction, which is illustrated by two plus signs, and another conductor section 32 extends in the opposite direction, which is illustrated by a minus sign. In other words, the coil 25 has a total of 1.5 windings 44. The coil 25 is electrically connected to the short-circuit means 28 on the first side 26. The coil 25 is electrically connected to a power supply unit 31 on the second side 27. In this embodiment, the coil 25 comprises a single conductor.

FIG. 3B shows a cross-section through a conductor section 32 of a coil 25 by way of example. The coil 25 comprises a plurality of conductor filaments arranged parallel to each other and electrically connected in parallel. Skin effects can thus be avoided or reduced.

Figure 4:
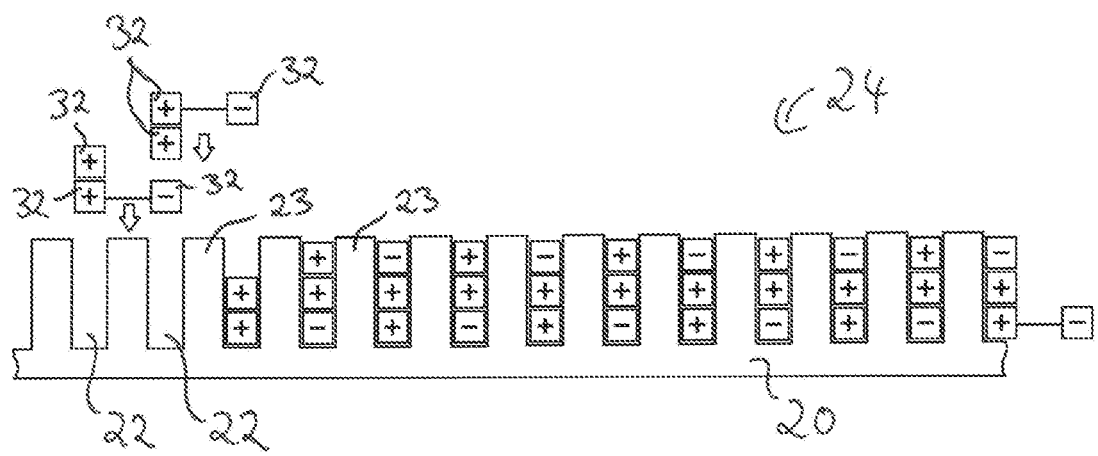

FIG. 4 shows the arrangement of the stator winding 24 according to an embodiment. For this purpose, a cross-section through the stator 20 is shown projected in a plane. The teeth 23 are shown arranged next to each other. The coils 25 are wound around the teeth 23 and arranged in the grooves 22. The open side of the grooves 22 can point, for example, in the direction of a rotor 29, which can be arranged in the stator 20. Each of the coils 25 has three conductor sections 32, which are marked by plus and minus signs. The longitudinal axis of the stator 20 thus extends perpendicular to the image plane. Two of the coils 25 are arranged outside the stator 20 to illustrate the coils 25 in the grooves 22. A first coil 25 is wound around a tooth 23 such that two conductor sections 32 are arranged in a first groove 22 and one conductor section 31 is arranged in a second groove 22. One second coil 25 is wound around one tooth 23 such that two conductor sections 32 are arranged in the same groove 22 as the one conductor section 32 of the first coil 25. A third conductor section 32 of the second coil 25 is arranged in a third groove 22. The remaining coils 25 are arranged as shown, by way of example, for the first and the second coil 25.

Figure 5:
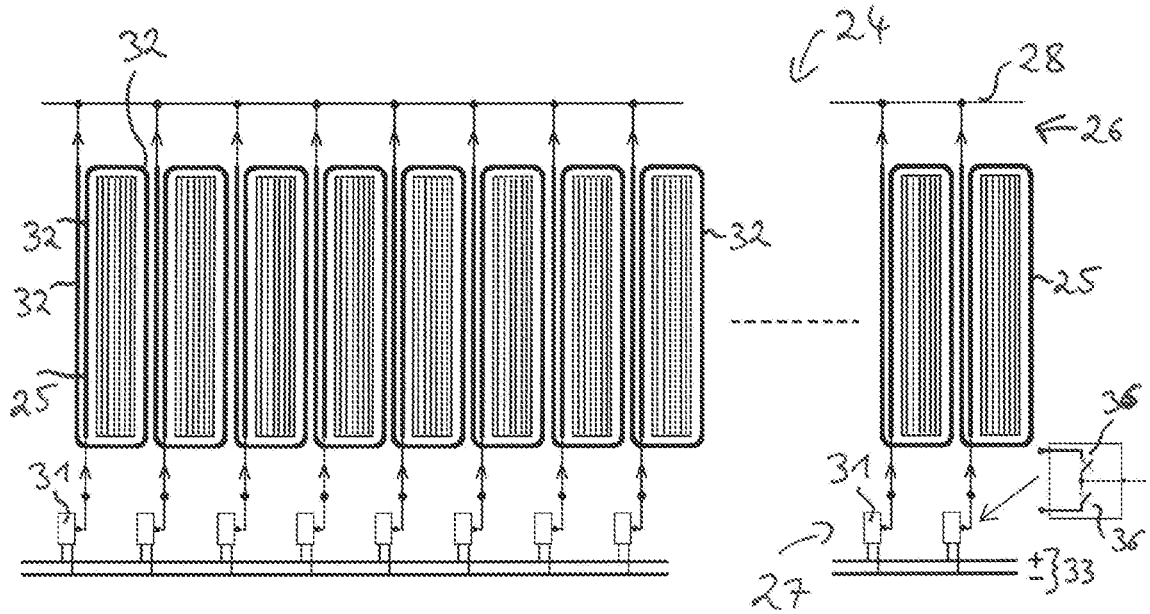

FIG. 5 shows a schematic representation of the stator winding 24 according to the embodiment shown in FIG. 4. The stator 20 has a plurality of coils 25. As shown in FIG. 4, the coils 25 each have three conductor sections 32. In each case, two conductor sections 32 of one coil 25 are arranged in the same groove 22 as one conductor section 32 of a further coil 25. The coils 25 are electrically connected to the short-circuit means 28 on the first side 26. On the second side 27, each of the coils 25 is connected to a power supply unit 31, which can be a half-bridge. For example, each of the power supply units 31 can have two switches 36 as shown for one of the power supply units 31. The power supply units 31 are electrically connected to a power supply 33 of the electric machine 21.

Figure 6:
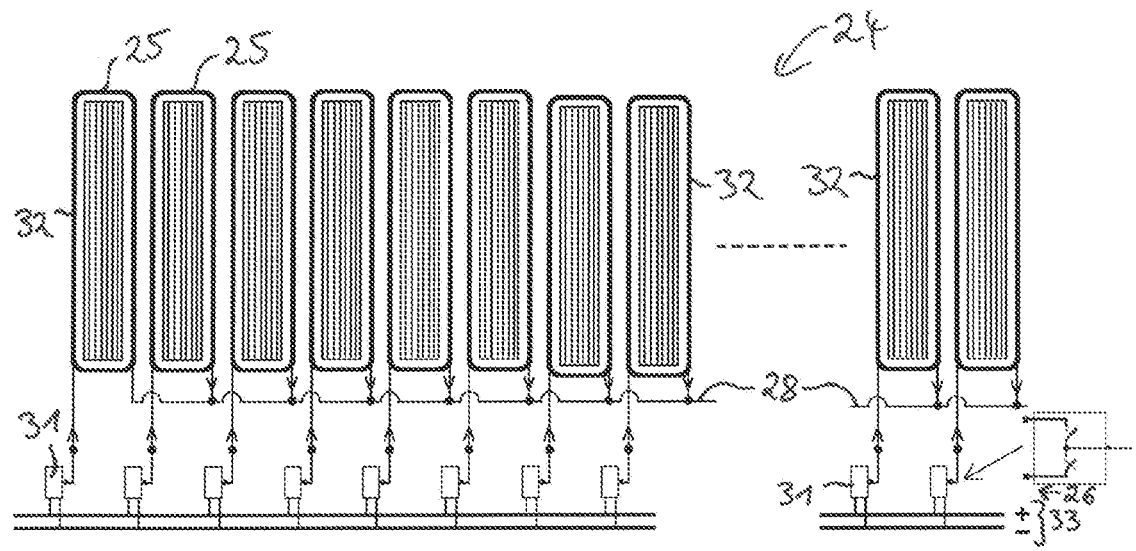

FIG. 6 shows a schematic illustration of the stator winding 24 according to a further embodiment. In contrast to the embodiment shown in FIGS. 4 and 5, in FIG. 6, each of the coils 25 has two conductor sections 32. Each of the coils 25 is electrically connected to the short-circuit means 28 on the first side 26 and to a power supply unit 31.

FIGS. 7A, 7B, 8A and 8B show schematically that individual conductor sections 32 of each coil 25 can be considered separately for the calculation of the magnetomotive force in an embodiment of the stator 20.

Figure 7A:
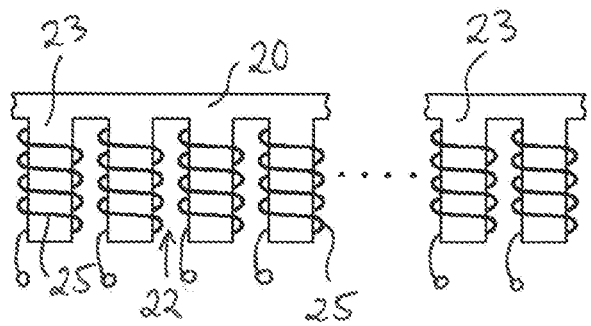

FIG. 7A shows a section of a cross-section through the stator 20 projected in a plane. The stator 20 has a plurality of teeth 23, around each of which one coil 25 is wound. For calculating the magnetomotive force of a rotary field generated by the stator winding 24, the coils 25 in FIG. 7A have an even number of conductor sections 32 and thus only a portion of the total number of conductor sections 32. The last conductor section 32 not shown in FIG. 7A is shown separately in FIG. 8A for calculating the magnetomotive force. In FIG. 7A, the distance between two grooves 22 corresponds to the angle φ between two electrical phases of the stator winding 24.

The proportion F1 of the conductor sections 32 shown in FIG. 7A to the magnetomotive force F of a rotary field generated by the stator winding 24 can be given as follows:

$$F_1(x,t) = \frac{m}{2}\frac{2N\hat{I}}{\pi}\sum_v \frac{1}{v}\xi\cos(\omega t - vx - (p-v)\varphi)$$

In this case, x specifies the position along the circumference of the stator 20, t specifies the time, m specifies the number of electrical phases, N specifies the number of conductor sections 32, Î specifies the amplitude of the respective phase current, ξ specifies the coil winding factor and ω specifies the frequency of the phase current.

The phase current $i_k$ is given by:

$$i_k = \hat{I}\cos\left(\omega t - p(k-1)\frac{2\pi}{m}\right) \quad (1)$$

The harmonic number v is given by:

$$v = m*g + p$$

wherein g is an integer. This means that the magnetomotive force F1 can have harmonic components of even and odd order.

The coil winding factor ξ is given by:

$$\xi = \sin\left(\frac{v\pi}{m}\right)$$

p is the number of pole pairs and a variable parameter which can be calculated via the number of stator grooves Q and can assume the following values:

$$p = \begin{cases} 1, 2, \ldots, \frac{Q+1}{2} - 1, & \text{for } Q \text{ being an odd number} \\ 1, 2, \ldots, \frac{Q}{2} - 1, & \text{for } Q \text{ being an even number} \end{cases}$$

Figure 7B:
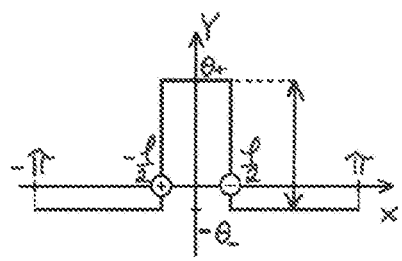

FIG. 7B shows furthermore that a winding function θ can be specified. The position x along the circumference of the stator 20 is specified in radians on the x-axis. The amplitude of the winding function θ is plotted on the y-axis. An example is a coil 25 having two conductor sections 32, which are indicated by the plus and minus signs. The conductor sections 32 are respectively arranged at the angles −φ/2 and φ/2. The positive amplitude of the winding function θ is given by:

$$\Theta_+ = N\left(1 - \frac{\varphi}{2\pi}\right)$$

The negative amplitude of the winding function θ is given by:

$$\Theta_- = N\frac{\varphi}{2\pi}$$

Figure 8A:
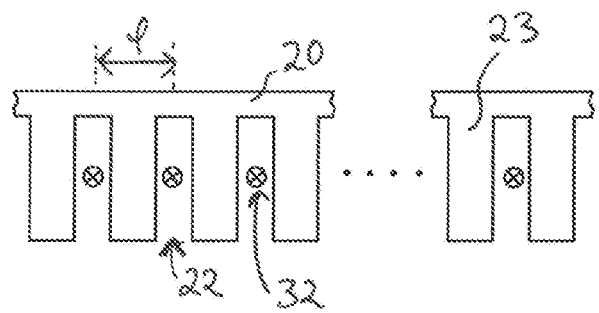

In FIG. 8A, analogous to FIG. 7A, a detail of a cross-section through the stator 20 is shown projected in a plane. In this case, the additional conductor section 32 is shown in the case where the coils 25 on a first side 26 of each tooth 23 have a greater number of conductor sections 32 by 1 than on a second side of each tooth 23. The conductor sections 32 point in this case into the image plane. The total magnetomotive force F of a rotary field generated by the stator winding 24 can be determined by the sum of the magnetomotive force F1 shown in FIG. 7A and a magnetomotive force F2 of the conductor sections 32 shown in FIG. 8A. The total magnetomotive force F thus relates to a stator winding 24 as shown, for example, with the embodiment in FIG. 5.

The proportion F2 of the conductor sections 32 shown in FIG. 8A to the magnetomotive force F of a rotary field generated by the stator winding 24 can be given as follows:

$$F_2(x,t) = \frac{m}{2}\frac{\hat{I}}{\pi}\sum_v \frac{1}{v}\sin\left(\omega t - v\left(x + \frac{\varphi}{2}\right) - (p-v)\varphi\right)$$

Thus, the total magnetomotive force F is given by:

$$F = F1 + F2$$

Figure 8B:
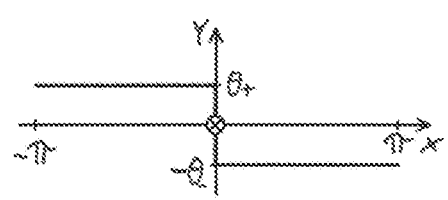

FIG. 8B, analogous to FIG. 7B, shows the winding function θ for the conductor sections 32 shown in FIG. 8A. The position x along the circumference of the stator 20 is specified in radians on the x-axis. The amplitude of the winding function θ is plotted on the y-axis. A conductor section 32, which is indicated by the cross, is shown by way of example.

Figure 9A:
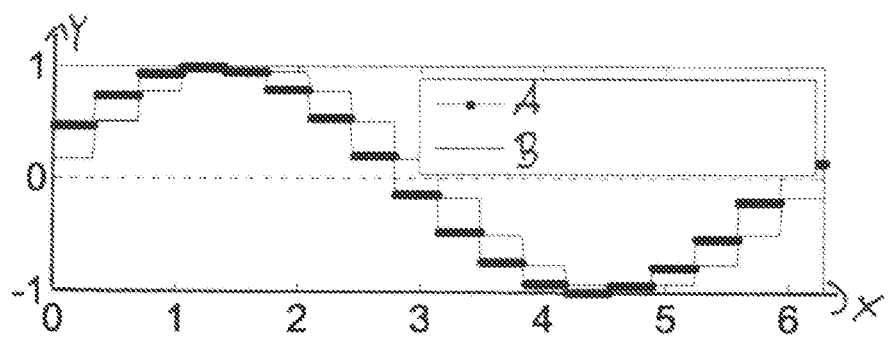
Figure 9A:
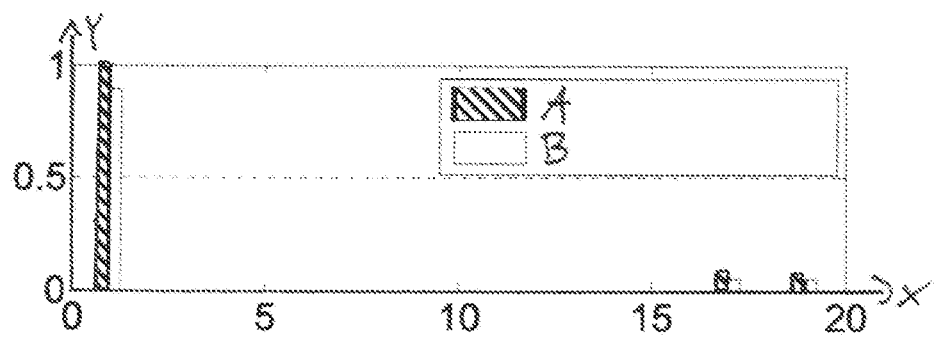

FIG. 9A shows simulations of the magnetomotive force for a stator 20 described here according to an embodiment and for a further stator. In the upper diagram, the angle φ along the circumference of the stator 20 is plotted on the x-axis in radians. The section shown thus corresponds to a cycle of 2π around the circumference of the stator 20. The magnetomotive force normalized to 1 is plotted on the y-axis. The curve A shows the magnetomotive force for a stator 20 according to an embodiment. The curve B shows the magnetomotive force for a stator in which the stator winding is formed by individual electrically conductive bars. One such stator is shown by way of example in FIG. 18A. The number of electrical phases is 18 for both stators of FIG. 9A. In the embodiment of the stator 20, the number of conductor sections 32 for each of the coils 25 on a first side 26 of each coil 25 is two and is one on a second side 27 of each coil 25. This means that each of the coils 25 has a total of three conductor sections 32. This embodiment is shown in FIG. 5 by way of example. In addition, the number of pole pairs for both stators shown in FIG. 9A is 1. The upper diagram in FIG. 9A shows that with a stator 20 described here, a magnetomotive force having a greater amplitude can be generated than with a stator in which the stator winding is formed by individual electrically conductive bars. In addition, both stators are designed to generate a rotary field.

The harmonic components of the magnetomotive force shown in the upper diagram are plotted on the x-axis in the lower diagram in FIG. 9A. The magnetomotive force normalized to 1 is plotted on the y-axis. Cases A and B correspond to those described with the upper diagram in FIG. 9A. In both stators, the magnetomotive force has a fundamental wave (p=1) and two further harmonic components, wherein the amplitudes of the two further harmonic components are significantly reduced with respect to the fundamental wave. It is further shown that the amplitude of the magnetomotive force is greater for a stator 20 described here than for a stator in which the stator winding is formed by individual electrically conductive bars.

Figure 9B:
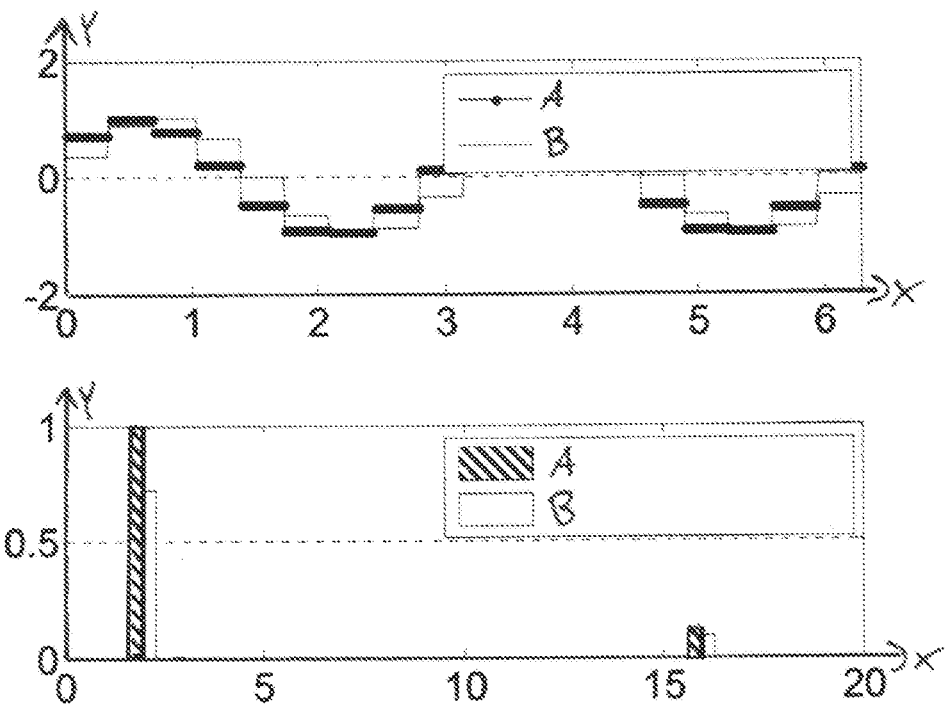

FIG. 9B shows the magnetomotive force for the two different stators as described with FIG. 9A for rotary fields having two pole pairs (p=2). In both described stators, the number of pole pairs of the generated rotary field can be changed by changing the phase currents, without it being necessary to change the structure of the respective stator. As described for FIG. 9A, in the upper diagram in FIG. 9B, the magnetomotive force is plotted in radians against the angle φ along the circumference of the stator 20 and in the lower diagram against the harmonic components. Even in the case of two pole pairs, curve A has a greater amplitude than curve B. For both stators, the magnetomotive force has a harmonic component of order 2 and a further harmonic component of order 16, wherein the amplitude of the harmonic component of order 16 is significantly smaller than the amplitude of the harmonic component of order 2.

Figure 9C:
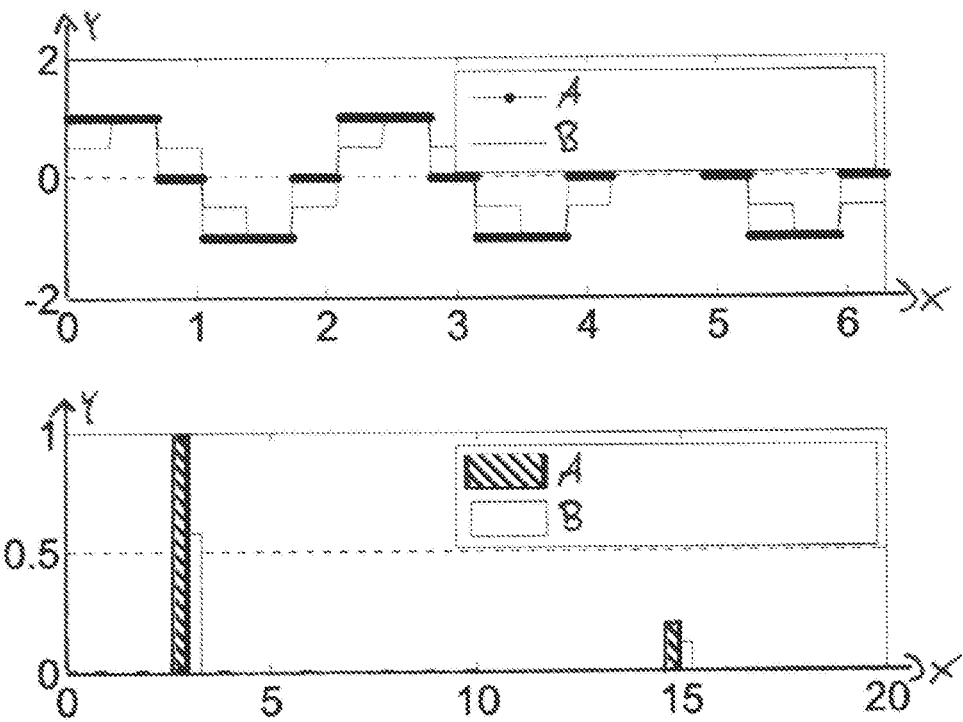

FIG. 9C shows the magnetomotive force for the two different stators as described with FIG. 9A for a number of three pole pairs of the rotary field. As described for FIG. 9A, in the upper diagram in FIG. 9C, the magnetomotive force is plotted in radians against the angle φ along the circumference of the stator 20 and in the lower diagram against the harmonic components. Even in the case of three pole pairs, curve A, at least in places, has a greater amplitude than curve B. For both stators, the magnetomotive force has a harmonic component of order 3 and a further harmonic component of order 15, wherein the amplitude of the harmonic component of order 15 is significantly smaller than the amplitude of the harmonic component of order 3. For the stator 20 according to an embodiment described here, the magnetomotive force has further harmonic components with very small amplitude.

Thus, according to an embodiment, the stator 20 described here has a greater magnetomotive force for each of the three pairs of pole pairs shown than a stator in which the stator winding is formed by individual electrically conductive bars. In addition, for the stator 20 described here, the power density of the rotary field generated increases with increasing number of pole pairs.

Figure 10:
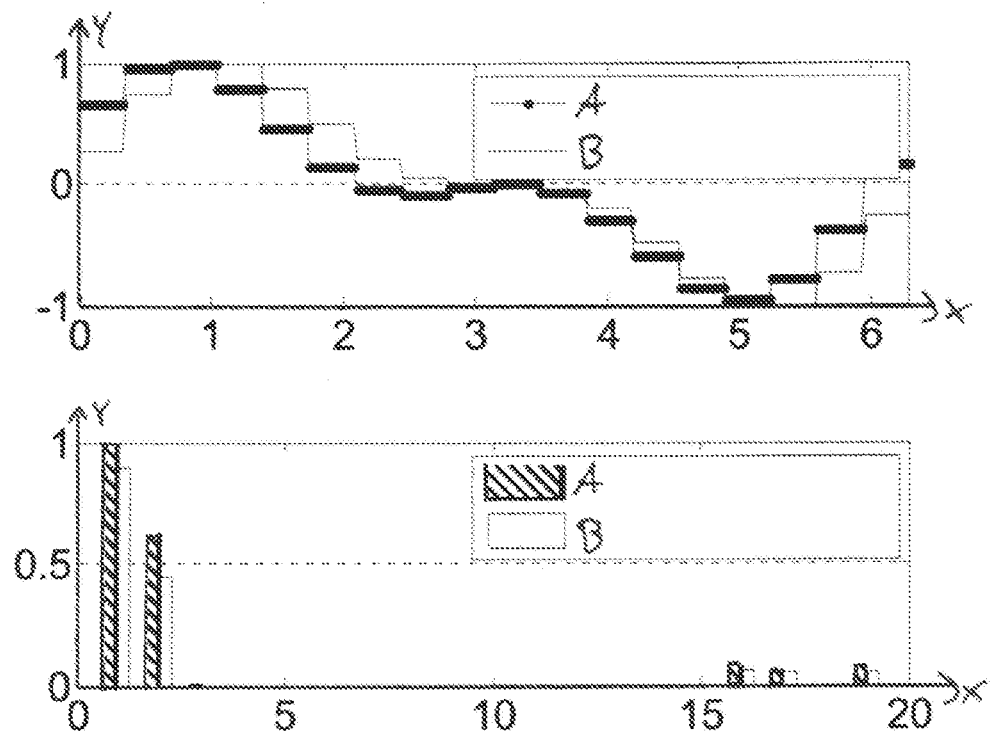

FIG. 10 shows the magnetomotive force for the two different stators as described with FIG. 9A. The magnetomotive force is shown for the case where two rotary fields having the numbers of pole pairs of 1 and 2 are simultaneously generated by the respective stator. As described for FIG. 9A, in the upper diagram in FIG. 10, the magnetomotive force is plotted in radians against the angle φ along the circumference of the stator 20 and in the lower diagram against the harmonic components. Also in this case, curve A has a greater amplitude than curve B. The lower diagram shows that for both stators, the magnetomotive force has harmonic components of order 1 and 2 and further harmonic components with significantly lower amplitude.

In the case where a stator 20 described here is designed to generate at least two rotary fields having different numbers of pole pairs, the proportions for the different numbers of pole pairs are added to the magnetomotive force.

In this case, the components F1 and F2 of the magnetomotive force are given as follows:

$$F_1(x, t) = \frac{m}{2} \frac{2N}{\pi} \sum_j \sum_v \frac{\hat{\imath}_j}{v} \xi \cos(\omega_j t - v_j x - (p_j - v_j)\varphi)$$

-continued $$F_2(x, t) = \frac{m}{2\pi} \sum_j \sum_v \frac{\hat{\imath}_j}{v} \sin\left(\omega_j t - v_j\left(x + \frac{\varphi}{2}\right) - (p_j - v_j)\varphi\right)$$

wherein for j each of the numbers of pole pairs is used. This means that the amplitude, the frequency and the direction of rotation can be controlled or adjusted separately for each of the numbers of pole pairs.

FIGS. 11A and 11B show two further embodiments of the stator 20. Since the number of the grooves 22 in the stator 20 is at least three and in addition is freely selectable, as shown in FIGS. 11A and 11B, the number of grooves 22 can be ten, for example.

In the embodiment in FIG. 11A, one coil 25 is wound around every second tooth 23 of the stator 20. As in FIG. 1, the winding direction of the coils 25 is specified by plus and minus signs. Thus, in each groove 22 are arranged only conductor sections 32 or one conductor section 32 of only one coil 25. Therefore, it is not necessary to electrically insulate conductor sections 32 of different coils 25 from each other within one groove 22. Each of the coils 25 is connected to a power supply unit 31 of its own.

In the embodiment in FIG. 11B, a coil 25 is wound around each tooth 23 of the stator 20. Thus, in each groove 22 are arranged conductor sections 32 or one conductor section 32 of two coils 25 in each case. Each of the coils 25 is connected to a power supply unit 31 of its own.

FIG. 12 shows the winding factors for various embodiments of the stator 20. In this case, the number of poles of the rotary field generated by the stator 20 are specified in the horizontal direction with the values 2-20. In the vertical direction, the values 4-18 specify the number of electrical phases of the stator 20. The table specifies the winding factors for the respective combinations. The coils 25 are arranged as shown in FIG. 11B in each of the embodiments of the stator 20. This means that one coil 25 is wound around each tooth 23 of the stator 20. The table in FIG. 12 shows that winding factors of up to 99.6% can be achieved with various embodiments of the stator 20.

FIG. 13A plots a compensation component by way of example. In this case, the angle φ along the circumference of the stator 20 is plotted on the x-axis in radians, and the amplitude of the respective harmonic component is normalized to 1 on the y-axis. The continuous line corresponds to the magnetic force of a harmonic component of a rotary field of order 2 generated by the stator 20. Rotary fields generated by a stator 20 described here can have several harmonic components. Some of the harmonic components can be undesirable because, for example, they contribute to vibrations, oscillations or noise development during operation of the electric machine 21 and at least in some cases do not contribute to the usable torque. A harmonic component can contribute to vibrations or noise development during operation of the electric machine 21 if the rotational frequency of the harmonic component is similar to or equal to the fundamental frequency of a vibration mode in the electric machine 21. In most cases, this only applies to low order harmonic components, since the fundamental frequencies of higher order vibration modes are often at rotational frequencies which are greater than a maximum rotational frequency achievable by the electric machine 21. Therefore, the harmonic component of order 2 is shown by way of example in FIG. 13A. At certain rotational frequencies, that is, at certain rotational speeds of the rotor 29, the harmonic component of order 2 can contribute to vibrations and noise development in the electric machine 21. The harmonic component of order 2 can be at least partially compensated with an additionally generated compensation signal.

A harmonic component of order m of the magnetic force can, for example, be given by:

$$f_m(x,t) = \vec{F}_m \cos(mx + \omega_m t - \varphi_m)$$

It is $\vec{F}_m$ the amplitude of the force density with:

$$\vec{F}_m = \frac{1}{2\mu_0} \vec{B}_{v1} \vec{B}_{v2}$$

Wherein $\vec{B}_{v1}$ and $\vec{B}_{v2}$ specify the magnetic flux densities of the harmonic components $v_1$ and $v_2$.

In order for a harmonic component of order m to be compensated by generating a compensation signal, the compensation signal in the stator must generate a further harmonic component, namely the compensation component. In order for the compensation component to be able to compensate for the harmonic component of order m, it must be true that the amplitude of the compensation component corresponds to the amplitude of the harmonic component of order m and that both signals are out of phase with each another by 180°.

FIG. 13A shows a compensation component by the dashed line. The compensation component and the harmonic component of order 2 are phase shifted to each other by an angle of 45°. In this case, the compensation component cannot completely compensate for the harmonic component of order 2.

FIG. 13B shows the harmonic component of order 2 of FIG. 13A. The axes are the same as in FIG. 13A. A compensation component is shown with the dashed line, which component is phase-shifted by 180° to the harmonic component of order 2. In this case, the harmonic component of order 2 can be completely compensated by the compensation component. The compensation component can thus be regarded as a further generated harmonic component of order 2, which, due to the phase shift of 180°, is designed to compensate for the undesired harmonic component of order 2. It is also possible that a harmonic component of the magnetic force induced by a rotary field is undesirable because of problems other than the occurrence of vibrations or noise, and is compensated for by a compensation component.

FIG. 14 shows a schematic structure of an embodiment of an activation unit 40 having a compensation unit 30. The activation unit 40 is connected to the electric machine 21. The stator of the electric machine 21 can be driven via a control unit 34. For example, the phase currents, the frequency and the load angle can be set via the control unit 34. In addition, the number of pole pairs of a rotary field to be generated can be adjusted. The adjustability of various parameters is represented by the four arrows. The control unit 34 is connected to a converter 35. The converter 35 can be, for example, an inverter. The converter 35 comprises a plurality of outputs 37. Each of the outputs 37 can be connected to a respective input 38 of the electric machine 21. Thus, each of the electrical phases of the stator 20 can be driven separately.

The activation unit 40 further has a compensation unit 30. The compensation unit 30 is designed to generate compensation signals for the at least partial compensation of an undesirable component of a magnetic force, wherein the magnetic force is induced by a rotary field generated by the stator 20 during operation of the electric machine. Parameters of the compensation signals can be set via the compensation unit 30, such as, for example, the amplitude, the frequency, the load angle or the order of a compensation component to be generated. The adjustability of various parameters is represented by the five arrows. The compensation unit 30 is further designed to generate the compensation signals at predefinable operating points of the electric machine 21. In these cases, the compensation signals and the signals of the control unit 34 are added to drive the electrical phases. This means that the respective compensation signal is superposed with the respective phase current for each electrical phase. The electrical phases of the stator 20 are fed with the superposition of these two signals from the converter 35. The predefinable operating points can be, for example, rotational speeds at which vibrations or undesired noises occur. These predefinable operating points can be determined, for example, on a test bench. Advantageously, the compensation signals are thus only generated when they are needed.

The activation unit 40 comprises the control unit 34, the compensation unit 30 and the converter 35.

FIG. 15 shows a cross-section through an embodiment of the electric machine 21. The electric machine 21 has a stator 20 and a rotor 29 rotatably mounted to the stator. The stator 20 of the electric machine 21 has 11 grooves 22. One coil 25 of the stator winding 24 is wound around each of the teeth 23 of the stator 20. The grooves 22 have openings to an inside of the stator 20. The rotor 29 is arranged on the inside of the stator 20. The rotor 29 is thus arranged in the stator 20. The rotor 29 has ten permanent magnets. The electric machine 21 can be a permanent magnet synchronous motor.

FIG. 16 shows the radial component of the magnetic force density for the embodiment of the electric machine 21 shown in FIG. 15. The angle along the circumference of the stator 20 is plotted in degrees in the upper diagram on the x-axis. The radial component of the force density is plotted on the y-axis in kN/m2. In this case, the radial directions are those directions that run parallel to the cross-section or a radius of the stator 20. The rotary field generated by the stator 20 during operation of the electric machine 21 has ten poles. The order of the harmonic components of the radial component of the force density is plotted on the x-axis in the lower diagram. The radial component of the force density is plotted on the y-axis in kN/m2. The harmonic component of order 0 has the largest amplitude. In addition, there are harmonic components of orders 10 and 11. However, in most cases, these only lead to undesirable vibrations or noise developments at rotational speeds greater than the usual maximum rotational speeds. In contrast, the harmonic component of order 1 could produce undesirable vibrations or noise developments at certain rotational speeds.

FIG. 17 shows by way of example the compensation of an undesired component of the magnetic force of order 1 of FIG. 16. The phase current ik of the harmonic component of order 1 results from equation (1). The phase current is superimposed with a compensation signal. The index 1 represents the phase current for generating the harmonic component of the magnetic force of order 1 and the index 2 represents the compensation signal:

$$i_k = \hat{i}_1 \cos\left(\omega_1 t - p_1(k-1)\frac{2k}{\pi} + \delta_1\right) + \hat{i}_2 \cos\left(\omega_2 t - p_2(k-1)\frac{2\pi}{m} + \delta_2\right)$$

wherein δ is the load angle.

The ratio of the effective values of the phase currents I2/I1 is plotted on the x-axis in FIG. 17. On the y-axis, the load angle is plotted in degrees, and on the z-axis is plotted the ratio of the portion of the harmonic component of order 1 of the radial component of the magnetic force density with compensation to the portion of the harmonic component of order 1 of the radial component of the magnetic force density without compensation. This means that about 80% of the undesired radial force component of order 1 can be compensated for in the event that the ratio of the effective values of the phase currents is about 0.6 and the load angle is about 50°.

FIGS. 18A and 18B show a stator 20 for an electric machine 21. The stator 20 and the electric machine 21 are not embodiments. The stator 20 is shown with a stator winding 24 in FIG. 18A. The stator 20 has a plurality of grooves 22 in which the stator winding 24 is arranged. The stator winding 24 is formed by individual electrically conductive bars 39, wherein in each case one of the bars 39 is arranged in one groove 22. The bars 39 are electrically connected to each other via a short-circuit means 28 on a first side 26 of the stator 20.

FIG. 18B shows the stator winding 24 with the short-circuit means 28 and without the stator 20. The bars 39 are arranged along the circumference of the stator 20 and extend parallel to each other.

Figure 19A:
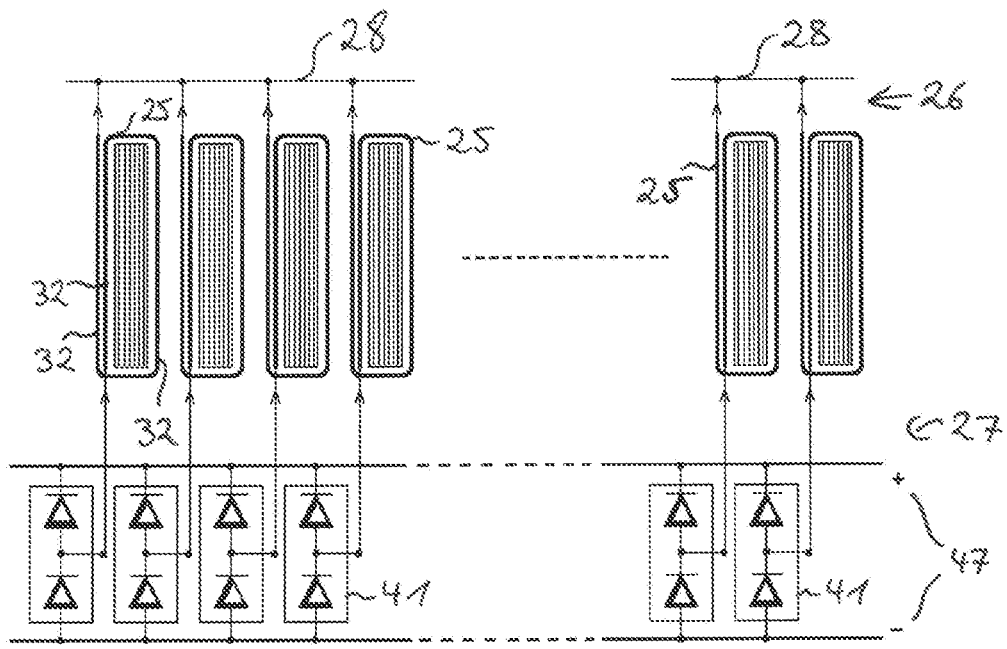

FIG. 19A shows a winding for a rotor 29 of the electric machine 21. The winding has a structure similar to the stator winding shown in FIG. 5. The rotor 29 has a plurality of coils 25. The coils 25 each have three conductor sections 32. On a first side 26, the coils 25 are electrically connected to a short-circuit means 28. On a second side 27, which faces away from the first side 26, each of the coils is connected to one rectifier 41. The rectifiers 41 are electrically connected to a voltage output 47. The induced voltage can thus be rectified for each of the coils 25.

Figure 19B:
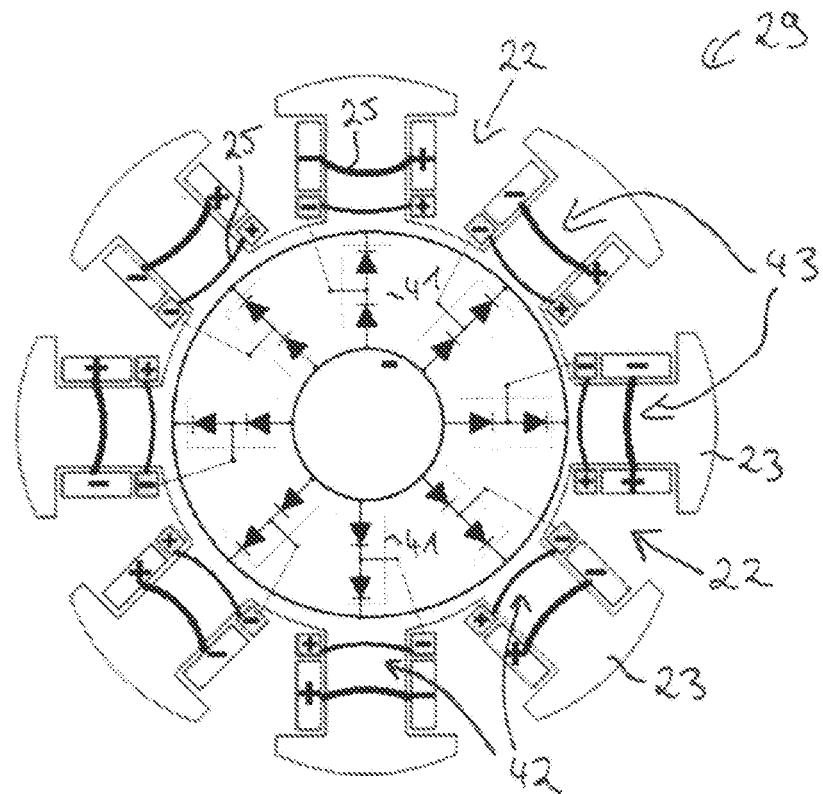

FIG. 19B shows a cross-section through an embodiment of a rotor 29. The rotor 29 has an excitation winding 42 and a field winding 43.

Furthermore, the rotor 29 has at least three, in this case eight, teeth 23 and at least three, in this case eight, grooves 22. One tooth 23 of the rotor 29 is arranged in each case between two grooves 22 along a circumference of the rotor 29. The excitation winding 42 has at least three coils 25, in this case eight coils 25. The excitation winding 42 is constructed as shown in FIG. 19A. Each of the coils 25 in this case is connected to a rectifier 41 of its own. The field winding 43 also has eight coils 25. The structure of the field winding 43 is shown in FIG. 19D. Such a rotor 29 can be used with a stator 20 described here for a current-excited (self-excited) synchronous machine and/or for a brushless current-excited synchronous machine.

Figure 19C:
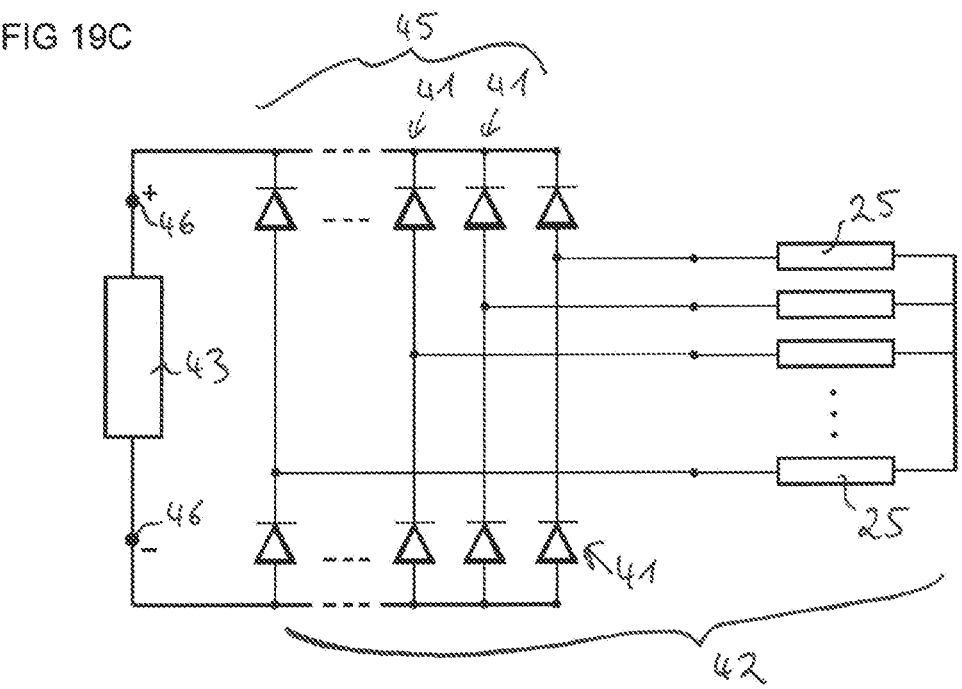
Figure 19D:
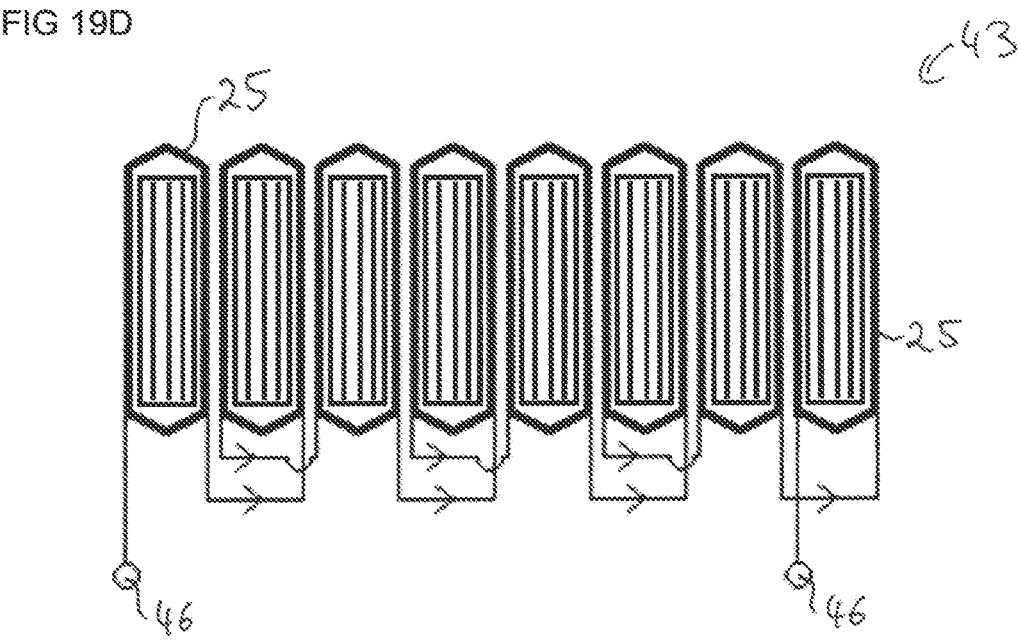

FIG. 19C shows a block diagram for an embodiment of a rotor 29. The rotor 29 can be used for a current-excited synchronous machine and the structure of the rotor 29 is shown in FIG. 19B. The excitation winding 42 having eight coils 25 is constructed as shown in FIG. 19A. The rectifiers 41 form a polyphase rectifier unit 45. The field winding 43 is electrically connected to the rectifier unit 45 via two connections 46.

FIG. 19D shows the structure of an embodiment of the field winding 43. The field winding 43 has eight coils 25, which are connected to each other in series. The field winding 43 is electrically connected to the rectifier unit 45 at the two connections 46 of the field winding 43.

The invention claimed is:

1. An electric machine having a stator and having a rotor rotatably mounted relative to the stator, wherein the stator comprises:
   a stator winding;
   at least three teeth; and
   at least three grooves,
wherein:
   each tooth of the at least three teeth is arranged along a circumference of the stator between two grooves,
   the stator winding comprises at least three coils, wherein each of the at least three coils is wound around a tooth of the stator so that the stator winding is a concentrated winding,
   a winding direction of all of the at least three coils is the same,
   each of the at least three coils is configured to be fed with its own phase current, and
   the stator is configured to generate, using only one stator winding which is the stator winding, at least two rotary fields with different numbers of pole pairs independently of one another, in particular simultaneously.

2. The electric machine according to claim 1, in which the phase currents are out of phase with each other.

3. The electric machine according to claim 1, in which a coil of the stator winding is wound around each tooth of the stator.

4. The electric machine according to claim 1, in which the at least three coils are electrically connected to each other on a first side of the stator via a short-circuit means.

5. The electric machine according to claim 1, in which the at least three coils each comprise a single conductor or each comprise a plurality of conductor filaments that are connected electrically in parallel and arranged parallel to each other.

6. The electric machine according to claim 1, in which the stator is configured to generate at least one rotary field in which the number of pole pairs is variable.

7. The electric machine according to claim 1, in which the number of conductor sections of the at least three coils on two neighboring grooves are different.

8. The electric machine according to claim 1, wherein the rotor has an excitation winding and a field winding.

9. The electric machine according to claim 8, wherein the excitation winding has at least three coils, and each of the at least three coils of the excitation winding is connected to a respective separate rectifier.

10. An activation unit for the electric machine according to claim 1, having a compensation unit which is configured to generate compensation signals for at least partially compensating at least one undesired component of a magnetic force, wherein the magnetic force is induced by a rotary field generated by the stator during operation of the electric machine.

11. The activation unit according to claim 10, in which the compensation signals are generated at least one predeterminable operating point of the electric machine.

12. A method for operating an electric machine, the method comprising:
   providing a stator of the electric machine with at least three teeth, at least three grooves and a stator winding which has at least three coils; and
   feeding the at least three coils of the stator with separate phase currents,
wherein:
   each tooth of the at least three teeth of the stator is arranged along a circumference of the stator between two grooves, each of the at least three coils is wound around a tooth of the stator so that the stator winding is a concentrated winding, a winding direction of all of the at least three coils is the same, and the stator is configured to generate, using only one stator winding which is the stator winding, at least two rotary fields having different numbers of pole pairs, in particular simultaneously.

13. The method for operating the electric machine according to claim 12, the method comprising:

generating at least one rotary field by the stator during operation of the electric machine;

generating at least three compensation signals by a compensation unit, wherein each compensation signal is associated with a respective phase current; and superimposing each of the at least three compensation signals over the respective associated phase current, wherein at least one undesired component of a magnetic force induced by the at least one rotary field is at least partially compensated.

\* \* \* \* \*